June 8, 1926. 1,588,394
S. B. WINN
LOW BODY TRACTOR TRAILER COMBINATION
Filed Nov. 24, 1922   4 Sheets-Sheet 4

Inventor
Sidney B. Winn,
Attorneys

Patented June 8, 1926.

1,588,394

UNITED STATES PATENT OFFICE.

SIDNEY B. WINN, OF LAPEER, MICHIGAN.

LOW-BODY TRACTOR TRAILER COMBINATION.

Application filed November 24, 1922. Serial No. 602,928.

My invention aims to provide a tractor trailer combination in which the overall length of a tractor and trailer may be reduced by having a portion of the trailer extend under a portion of the tractor, for instance, an overhanging portion, seat or cab, and by locating coupling and uncoupling mechanism, brake mechanism, and draft rigging and other devices under the cab the occupants of the cab can readily control such mechanism or devices.

My invention further aims to provide a tractor trailer combination wherein the trailer has a low body permitting of the operator of the tractor making observations in or over the body of the trailer, particularly when loading or unloading, and the low body possesses the one-step entrance and other advantages incident to placing the floor or entrance of such body in proximity to the ground. Such advantages are numerous for either pleasure or commercial vehicles.

My invention further aims to furnish a trailer with ground engaging wheels and track engaging wheels in addition to the usual rear supporting wheels, the track engaging wheels being engageable with a track on a tractor to permit of the tractor raising the ground engaging wheels so that the weight of the forward end of the trailer may be sustained by the tractor. By using the coupling and uncoupling mechanism, brake mechanism and other devices disclosed in my companion application, filed under even date (presented herein, excepting as to specific details, in the present disclosure, the details being more completely disclosed in the companion application, Serial No. 602,929), the operator of the tractor can readily control the trailer, make exceedingly short turns, and be within speaking distance of an occupant of the trailer. This latter advantage is important when the trailers are in the form of coach or car bodies for holding passengers, and this latter use permits of the trailers being used as temporary stations, for instance, for suburbanites, and such stations can be picked up by a tractor and hauled to a desired designation.

My invention further aims to provide a tractor trailer combination wherein the tractor is coupled and uncoupled relative to the trailer to permit of the trailer being loaded or unloaded, while other duties are performed by the tractor. Such combinations are in use and involve an adjustable supporting leg for the trailer, when not coupled to the tractor, consequently there must be adjustment of the leg preparatory to hauling the trailer or departing therefrom. My present invention obviates the necessity of any leg adjustment, and consequently there is a greater degree of safety in the operation of the tractor trailer combination.

My invention further aims to provide a tractor trailer combination wherein the trailer is in the form of a bus or car adapted to be coupled to the tractor with the coupled end of the bus overhanging the tractor. This is accomplished without raising the floor or disturbing the seats or seating capacity of the bus and a close coupling is effected conducive to easy control and a short overall wheel base.

The construction entering into my invention will be hereinafter specifically described and then claimed and reference will now be had to the drawings, wherein Figure 1 is a side elevation of the tractor trailer combination showing in full lines the trailer coupled to the tractor and in dot and dash lines the forward end of the trailer about to be released by the tractor;

Figure 1:
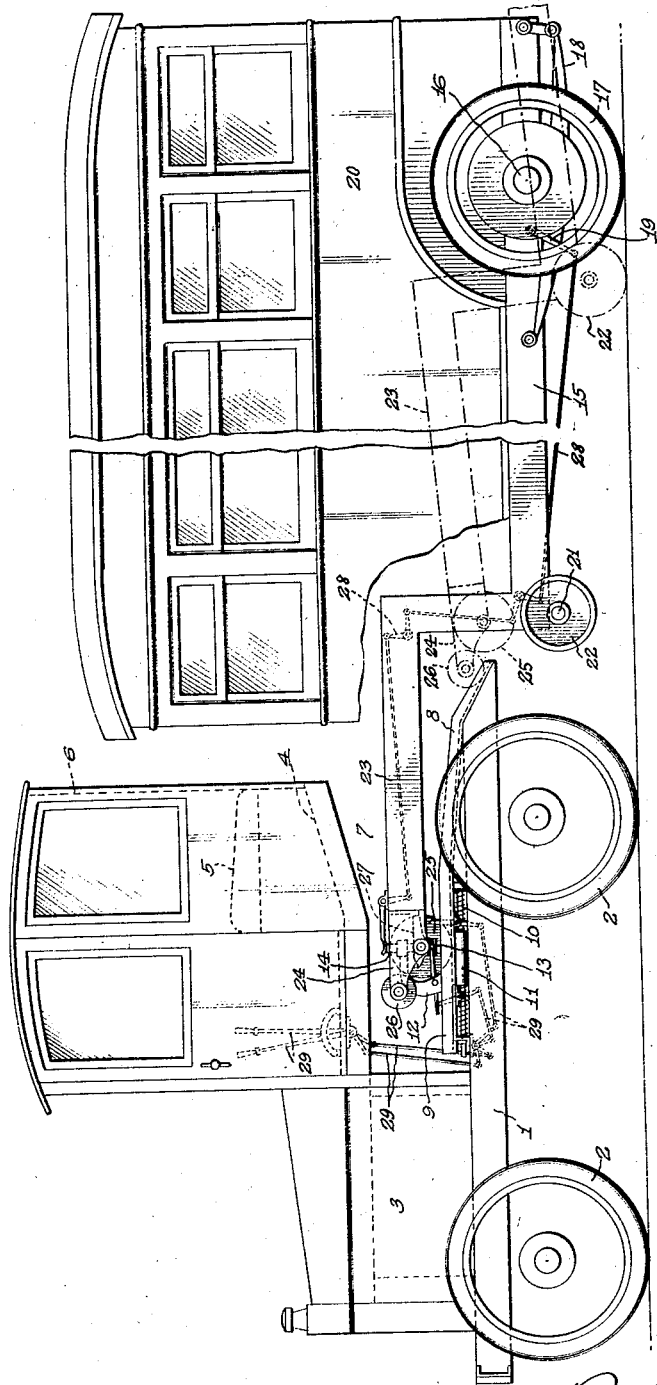

In the drawings, the reference numeral 1 denotes a tractor chassis or frame provided with ground engaging wheels 2, power plant 3, a superposed overhanging cab, body or seat frame 4, a seat 5 and a cab or operating compartment 6. The frames 1 and 4 cooperate in providing a pocket, chamber, or runway 7 under the seat or cab, and on the tractor chassis or frame 1 is a track composed of inclined rails 8 and a turn-table or platform 9. Below the turn table or platform 9 is a draft appliance 10 supporting a coupling and uncoupling mechanism and part of the brake mechanism, the coupling and uncoupling mechanism of the tractor including a support 11, an arm 12, a ball coupling 13 and a king pin 14, these and associated elements being described more in detail in my companion application.

The trailer includes a chassis or frame 15 having its rear end supported by a rear axle assembly 16 including ground engaging wheels 17, springs 18 and brakes or braking mechanism 19. The chassis or frame 15 is in close proximity to the ground and on said frame is a body 20 preferably of less height than the cab 6 on the tractor so that the driver or occupant of the seat 5 may look rearwardly over the top of the body 20, particularly when backing. The body 20 may be for commercial or pleasure purposes equipped with one or more doors.

Figure 2:
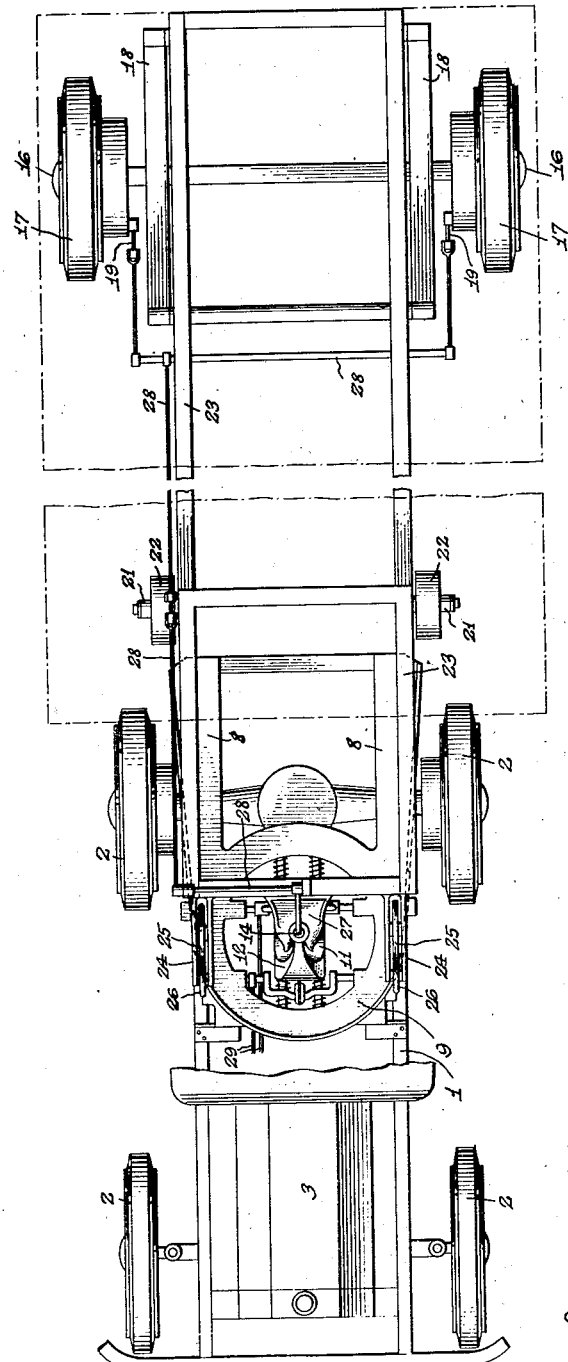
Fig. 2 is a plan of the same.

At the forward end of the chassis or frame 15 is an axle 21 provided with ground engaging wheels 22, adapted to co-operate with the wheels 17 of the rear axle assembly in supporting the chassis or frame 15 so that it may be moved about independent of the tractor, and when the forward end of the trailer is supported by the rear end of the tractor, the ground engaging wheels 22 are elevated relative to the ground, as will hereinafter appear. The forward end of the frame or chassis 15 has a raised and forwardly extending coupling portion 23 about which the body 20 may be built, especially when the body is of greater width than the frame or chassis, as indicated by dot and dash lines in Fig. 2. The raised coupling portion 23 is normally in a plane above the frame or chassis 15 and extends forwardly from the body 20 so that it may enter the pocket or runway 7 of the tractor. On the forward end of the raised coupling portion 23 of the frame 15 are a set of bearings 24 each provided with a main track engaging wheel 25 and an auxiliary track engaging wheel 26, the wheels 26 being set in a plane forward and above the axial plane of the wheels 25, so that the wheels 26 will encounter the rails 8 of the track in advance of the main wheels 25 and cause the forward end of the trailer to be elevated as the tractor is backed under the trailer. The main wheels 25 are eventually brought on to the rails 8 and render the auxiliary wheels inactive, such taking place as the tractor backs under the trailer. Two sets of wheels accomplish the transfer of the trailer from the ground to the tractor, and it is obvious that additional wheel sets or the equivalent thereof may be used to attain a gradual and safe elevation of the end of the trailer. On the forward end of the raised coupling portion 23 is a socket coupling member 27 which receives the ball coupling member 13 and establishes a connection between the tractor and trailer for movement in synchronism, but permits of these two vehicles being separated and independently used.

The trailer frame or chassis 15 includes a brake operating mechanism, generally designated 28, employed to operate or apply the brakes 19 of the trailer, and on the tractor frame or chassis 1 is a mechanism, generally designated 29, which extends into the cab 6 and permits of the driver or operator within the cab controlling the brake mechanism of the trailer by virtue of a king pin 14 forming part of the coupling and uncoupling mechanism between the tractor and the trailer, and such other devices as may be essential for successful operation of the tractor trailer combination. This invention is not directed to such mechanism, because the same are taken care of in my companion application, but more particularly to the constructive arrangement of parts which permits of the trailer body being contiguous to the tractor seat; the coupling and uncoupling mechanism being located under the superposed frame 4, and the trailer used without an adjustable supporting leg or support. With the raised coupling portion 23 providing clearance for the rear end of the tractor, it is apparent that very short turns are possible; that the coupling and uncoupling mechanism is more or less protected against the elements; that for bus or passenger service the tractor operator can observe trailer conditions, and that by virtue of the low body loading and unloading will be greatly facilitated for any kind of freight.

Figure 3:
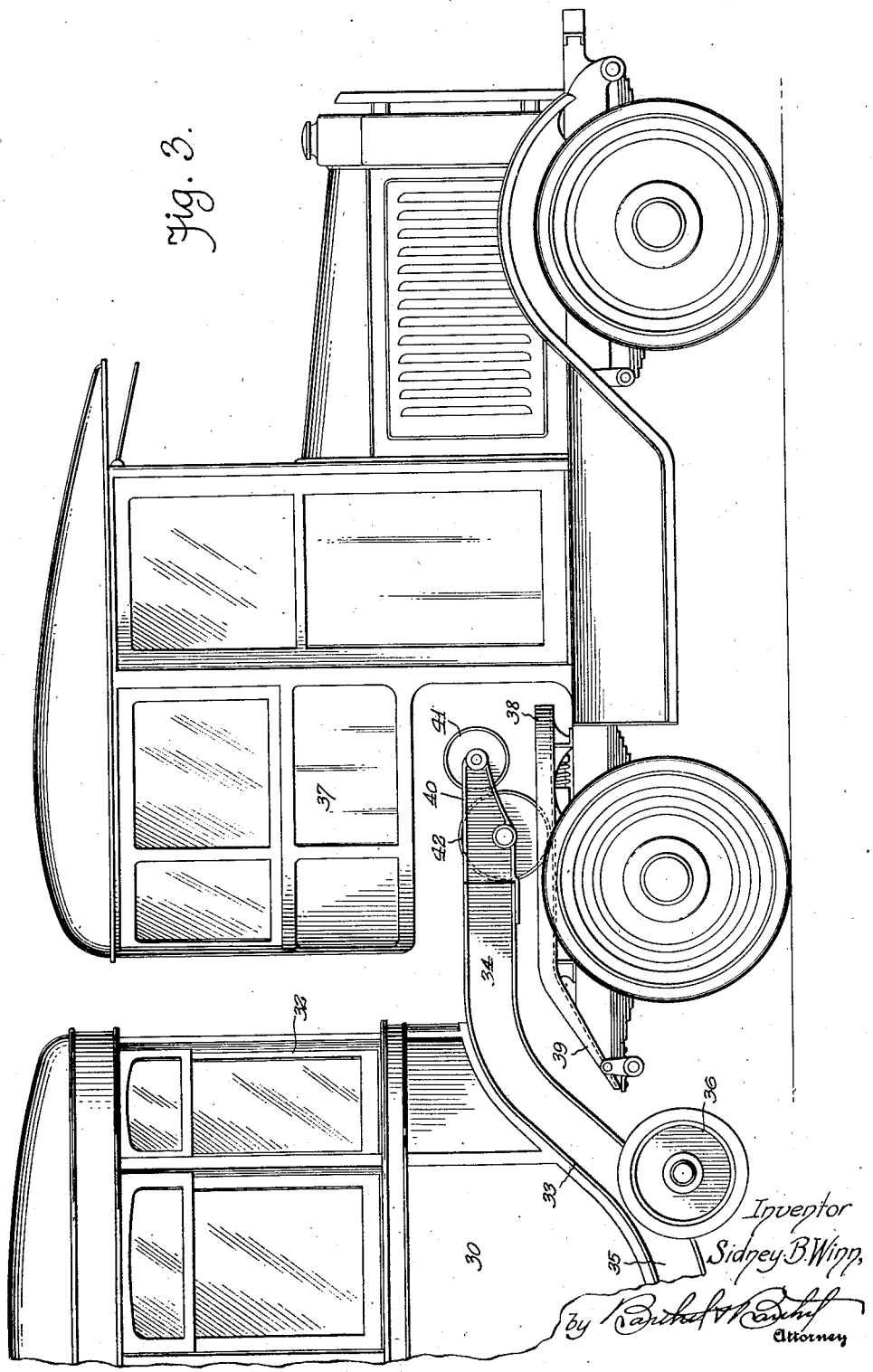
Fig. 3 is an elevation of a tractor trailer combination, partly broken away, showing another form of trailer.
Figure 4:
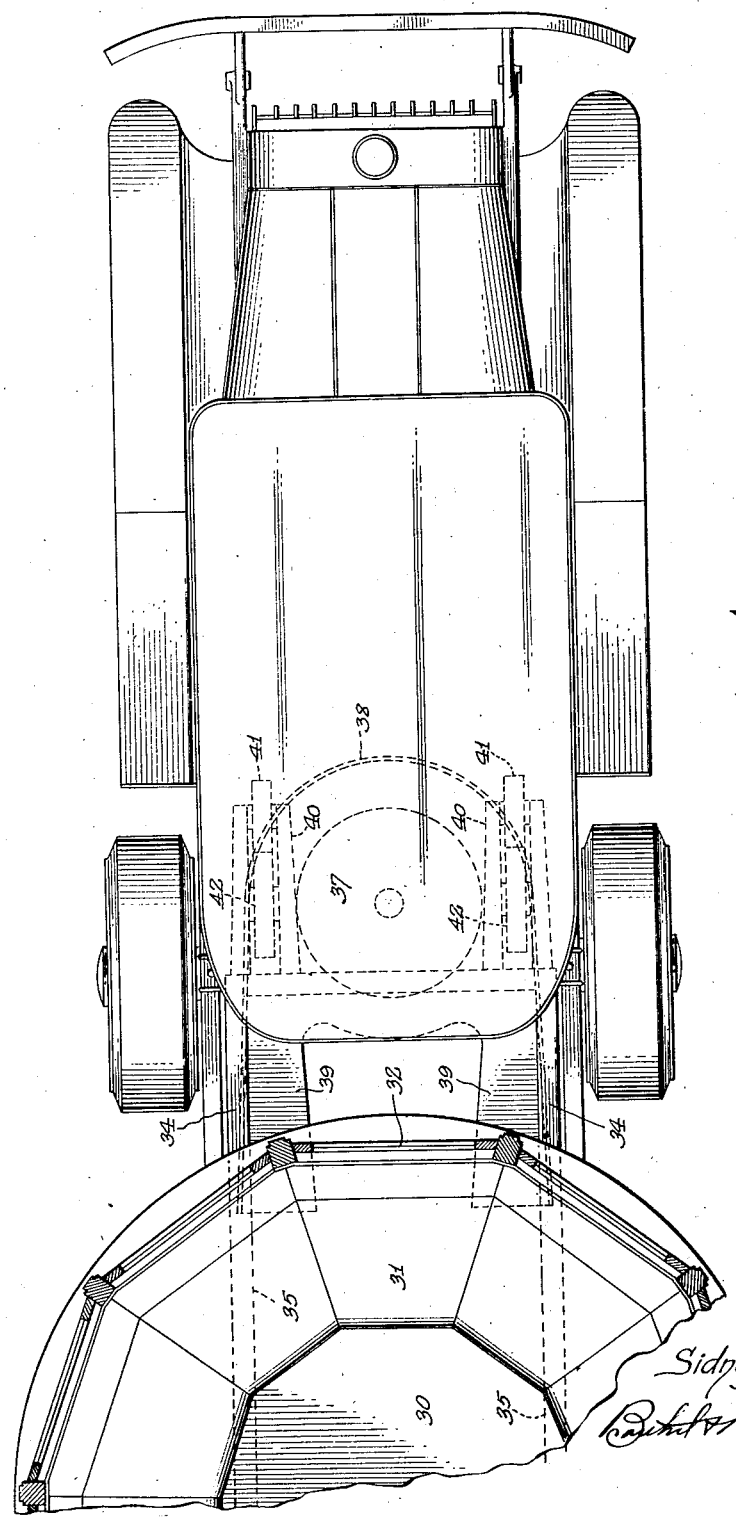
Fig. 4 is a plan of the same, with the trailer in horizontal section.

Reference will now be had to Figs. 3 and 4, showing a slight modification of my invention, wherein the trailer is in the form of a low-slung or supported bus body 30 of large seating capacity including seats 31 at the forward rounded end 32 of the bus body, and this end of the body is undercut or shaped, as at 33, to be supported by the upwardly and forwardly extending coupling portion 34 of a trailer chassis frame 35. The forward end of this chassis frame has truck or ground engaging wheels 36 adapted to be elevated off of the ground when the tractor is coupled to the trailer.

The tractor, as in the preferred form of construction, includes a rearwardly overhanging body 37, a platform 38 and a rearwardly inclined track 39. On the forward end 34 of the trailer frame 35 are bearings or brackets 40 supporting a plurality of wheels, preferably two sets 41 and 42 corresponding to the wheels 25 and 26 previously referred to. The set of wheels 41 is adapted to engage the track 39 and initially elevate the ground engaging wheels 36 as the tractor is backed under the forward end of the trailer, and eventually the wheels 42 engage the track 39, ride upwardly on to the platform 38, and support the forward end 34 of the frame 35 under the body 37, with the wheels 41 elevated above the platform 38. For the sake of clearness the coupling, uncoupling and brake mechanism has not been illustrated in these two views, but it is to be understood that such mechanisms are employed or the equivalent thereof.

I do not care to confine my invention to any particular arrangement of the brake mechanism as such arrangement depends upon the size and style of the trailer body, and while in the drawings there are illustrated the preferred embodiments of my invention, it is to be understood that the structural elements are susceptible to such changes as fall within the scope of the appended claims.

What I claim is:—

1. In a tractor trailer combination, wherein the tractor and trailer are coupled for combined service and disengageable by uncoupling to permit independent service, and wherein the coupling and uncoupling operations are rendered active by relative movement of the tractor and trailer in the direction of traction, a tractor having a seat, a trailer adapted to have its forward end extend under the seat of said tractor, and means adapted to couple the forward end of the trailer to the tractor by such relative movement of the tractor and trailer.

2. A tractor-trailer combination as in claim 1, characterized in that the body of the trailer extends on opposite sides of the coupling plane of the tractor and trailer with the control station of the tractor located wholly above such plane.

3. In a tractor trailer combination, wherein the tractor and trailer are coupled for combined service and disengageable by uncoupling to permit independent service, and wherein the coupling and uncoupling operations are rendered active by relative movement of the tractor and trailer in the direction of traction, a tractor having a cab, a trailer having a portion extending under the tractor cab and engageable and disengageable with said tractor by such relative movement of the tractor and trailer, the control station for the engaging and disengaging manipulations being located within the cab.

4. A tractor trailer combination as called for in claim 3, wherein the trailer has a brake mechanism operatable from within the tractor cab.

5. The combination of a tractor having a seat and a track, a trailer having track engaging wheels adapted to be elevated relative to the ground to move on said track and under the tractor seat by relative movement of the tractor and trailer in the direction of traction, and means under the tractor seat and rendered active by such relative movement, for retaining the trailer in engagement with the tractor.

6. The combination called for in claim 5, wherein the trailer has ground engaging wheels in addition to the track engaging wheels.

7. In tractor-trailer combinations, wherein the tractor and trailer are coupled together for combined service and disengageable by uncoupling to permit independent service, and wherein the coupling and uncoupling operations are rendered active by relative movement of the tractor and trailer in the direction of traction, a trailer having a body portion extending below the coupling plane and a coupling portion adapted to be moved in the coupling plane during the coupling operation, and a tractor having a pocket to receive the coupling portion when in the coupling plane, the upper wall of the pocket overlying such coupling portion when the tractor and trailer are coupled, the control station of the tractor being located wholly above the plane of the pocket.

8. A combination as in claim 7 characterised in that the coupling portion of the trailer extends into the trailer body portion.

9. In a tractor trailer combination, wherein the tractor and trailer are coupled for combined service and disengageable by uncoupling to permit independent service, and wherein the coupling and uncoupling operations are rendered active by relative movement of the tractor and trailer in the direction of traction, a tractor, a trailer, a cab on the tractor, a body on the trailer close to said cab, and means under said cab coupling the tractor and trailer by such relative movement of the tractor and trailer.

10. The combination of a tractor having a chassis, a trailer having a body with its bottom in a plane lower than the plane of the tractor chassis, and means extending forwardly from said trailer adapted for coupling said trailer to said tractor, said forwardly-extending means being positioned above the plane of the chassis when the tractor and trailer are coupled, the control station of the tractor being located wholly above the top plane of said means.

11. A tractor trailer combination having occupant-receiving bodies close together, and the trailer having a coupling portion extending on to the tractor above the top plane of the tractor chassis and under the tractor body and establishing an operative connection between said tractor and trailer.

12. A tractor trailer combination as called for in claim 11, wherein the coupling portion of the trailer is a continuation of the lower body supporting frame of the trailer.

13. In tractor-trailer combinations, wherein the tractor and trailer are coupled together for combined service and disengageable by uncoupling to permit independent service, a tractor having a chassis carrying coupling mechanism and means for defining a coupling plane above the chassis, a trailer having a forwardly-extending portion carrying coupling mechanism adapted to cooperate with the tractor coupling mechanism in such coupling plane by relative movement of tractor and trailer in the direction of traction, and a control station carried by the tractor, said station being located wholly above the top plane of the trailer forwardly-extending portion.

14. A combination as in claim 13 characterized in that the control station extends on opposite sides of a vertical plane corresponding to the plane of the coupling axis when the tractor and trailer are coupled.

In testimony whereof I affix my signature.

SIDNEY B. WINN.